United States Patent
Gruber et al.

(10) Patent No.: US 12,116,068 B2
(45) Date of Patent: Oct. 15, 2024

(54) STEERING KNUCKLE OF A UTILITY VEHICLE, AXLE ASSEMBLY AND VEHICLE AXLE OF A UTILITY VEHICLE

(71) Applicant: KNORR-BREMSE Systeme fuer Nutzfahrzeuge GmbH, Munich (DE)

(72) Inventors: Markus Gruber, Ebersberg (DE); Stefan Kemmler, Tuebingen (DE); Matthias Klingner, Moorenweis (DE); Jakob Lachermeier, Freising (DE); Wolfgang Pahle, Bad Wiessee (DE); Edgar Ruhl, Ingolstadt (DE); Robert Trimpe, Wessling (DE); Alexander Werth, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/595,725

(22) PCT Filed: May 19, 2020

(86) PCT No.: PCT/EP2020/063901
§ 371 (c)(1),
(2) Date: Nov. 23, 2021

(87) PCT Pub. No.: WO2020/239523
PCT Pub. Date: Dec. 3, 2020

(65) Prior Publication Data
US 2022/0258797 A1    Aug. 18, 2022

(30) Foreign Application Priority Data
May 24, 2019    (DE) ...................... 10 2019 113 942.2

(51) Int. Cl.
*B62D 7/18*    (2006.01)
*B60B 27/00*   (2006.01)
*B60G 7/00*    (2006.01)

(52) U.S. Cl.
CPC ............ *B62D 7/18* (2013.01); *B60B 27/0052* (2013.01); *B60G 7/001* (2013.01);
(Continued)

(58) Field of Classification Search
CPC .... B62D 7/18; B60G 7/001; B60G 2200/422; B60G 2200/44; B60G 2206/50;
(Continued)

(56) References Cited

U.S. PATENT DOCUMENTS 1,697,784 A * 1/1929 Seaholm ................. B62D 7/18
                                                    403/138
1,937,821 A * 12/1933 Jarrett .................. B60K 17/306
                                                    180/259
(Continued)

FOREIGN PATENT DOCUMENTS

CN    101618734 A    1/2010
CN    104175804 A    12/2014
(Continued)

OTHER PUBLICATIONS

Japanese-language Office Action issued in Japanese Application No. 2021-569538 dated Dec. 6, 2022 with English translation (13 pages).
(Continued)

*Primary Examiner* — Timothy Wilhelm
(74) *Attorney, Agent, or Firm* — Crowell & Moring, LLP (57) ABSTRACT

A steering knuckle of a utility vehicle has a main body, a steering knuckle bearing for receiving in a rotating articulated manner a vehicle axle, a hub-type, cup-shaped receiving portion, open towards a rim of a vehicle wheel, in which
(Continued)

portion an anti-friction bearing and a bearing journal can be received. The main body has an opening for receiving a drive shaft. The opening leads into the hub-type receiving portion. An axle assembly and a vehicle axle of a utility vehicle are also provided.

12 Claims, 8 Drawing Sheets

(52) U.S. Cl.
CPC ....... *B60B 27/0031* (2013.01); *B60B 27/0036* (2013.01); *B60G 2200/422* (2013.01); *B60G 2200/44* (2013.01); *B60G 2206/50* (2013.01)

(58) Field of Classification Search
CPC .......... B60G 2200/30; B60G 2204/149; B60G 2206/30; B60G 9/00; B60B 27/0052; B60B 27/0031; B60B 27/0036; B60B 27/065
See application file for complete search history.

(56) References Cited

U.S. PATENT DOCUMENTS

| | | | | |
|---|---|---|---|---|
| 2,046,602 A * | 7/1936 | Baker | .................... | B60B 35/007 180/359 |
| 2,133,536 A * | 10/1938 | Canfield | .............. | B60K 17/303 180/262 |
| 2,785,907 A * | 3/1957 | Hutchens | ............... | B60G 7/008 244/50 |
| 4,037,680 A * | 7/1977 | Grove | .................. | B60K 17/306 280/86.753 |
| 4,223,902 A * | 9/1980 | Fry | ...................... | B60K 17/043 280/93.513 |
| 5,538,273 A * | 7/1996 | Osenbaugh | ............ | B62D 17/00 280/86.756 |
| 5,562,186 A * | 10/1996 | Osenbaugh | ............ | B60T 1/065 244/50 |
| 5,749,594 A * | 5/1998 | Krisher | .................. | B62D 17/00 280/124.1 |
| 5,911,425 A | 6/1999 | Hofmann et al. | | |
| 6,079,512 A | 6/2000 | Krisher | | |
| 6,179,308 B1 * | 1/2001 | Mielauskas | .............. | B62D 7/18 180/257 |
| 6,398,240 B1 * | 6/2002 | Taylor | ..................... | B60T 1/065 280/93.511 |
| 6,450,585 B1 * | 9/2002 | Kochsiek | ............ | B60B 27/0036 301/124.1 |
| 6,729,633 B1 * | 5/2004 | Irwin | ..................... | B62D 17/00 280/86.75 |
| 7,976,036 B2 * | 7/2011 | Reid | ........................ | B62D 7/18 301/124.1 |
| 9,566,840 B2 * | 2/2017 | Seethaler | ................. | B60G 3/28 |
| 10,052,913 B2 * | 8/2018 | Sinka | ................. | B60B 27/02 |
| 10,358,165 B2 * | 7/2019 | Reid | .................... | B60B 35/128 |
| 10,589,568 B2 * | 3/2020 | Albl | .................... | B60B 27/0073 |
| 10,625,778 B2 * | 4/2020 | Buchwitz | .............. | B60B 27/065 |
| 10,704,602 B2 * | 7/2020 | Gonska | .................. | B60B 27/02 |
| 10,793,189 B2 * | 10/2020 | Batz | ......................... | B62D 7/18 |
| 2003/0218309 A1 * | 11/2003 | Wang | .................... | F16C 19/386 280/93.512 |
| 2004/0141675 A1 * | 7/2004 | Kapaan | .................... | B62D 7/18 384/589 |
| 2004/0188969 A1 * | 9/2004 | Huhn | ....................... | B62D 7/18 280/93.512 |
| 2004/0235606 A1 * | 11/2004 | Brossard | .............. | B60K 17/306 475/222 |
| 2004/0262875 A1 | 12/2004 | Hamperl | | |
| 2005/0073123 A1 * | 4/2005 | Kapaan | .................... | B62D 7/18 280/93.512 |
| 2008/0303234 A1 * | 12/2008 | Mc Cann | ................. | B60G 3/06 280/124.134 |
| 2009/0180726 A1 | 7/2009 | Siebeneick et al. | | |
| 2014/0345994 A1 | 11/2014 | Varela et al. | | |
| 2017/0036693 A1 | 2/2017 | Reid | | |
| 2018/0015782 A1 | 1/2018 | Heraudet et al. | | |
| 2018/0066720 A1 | 3/2018 | Dilworth et al. | | |
| 2022/0219755 A1 * | 7/2022 | Blessing | ............... | B60B 35/003 |

FOREIGN PATENT DOCUMENTS

| | | |
|---|---|---|
| CN | 108706044 A | 10/2018 |
| DE | 43 14 311 A1 | 11/1994 |
| DE | 199 48 122 A1 | 4/2001 |
| DE | 101 61 207 A1 | 6/2003 |
| DE | 102014224683 A1 * | 6/2016 |
| DE | 10 2017 201 615 A1 | 8/2018 |
| JP | 61-177902 U | 11/1986 |
| JP | 62-53285 A | 3/1987 |
| JP | 8-268315 A | 10/1996 |
| JP | 8-509536 | 10/1996 |
| JP | 2004-286161 A | 10/2004 |
| JP | 2018-508419 A | 3/2018 |
| RU | 2 509 657 C2 | 3/2014 |
| WO | WO 03/053766 A1 | 7/2003 |
| WO | WO 2013/083442 | 6/2013 |

OTHER PUBLICATIONS

International Search Report (PCT/ISA/210) issued in PCT Application No. PCT/EP2020/063901 dated Jul. 6, 2020 with English translation (five (5) pages).
German-language Written Opinion (PCT/ISA/237) issued in PCT Application No. PCT/EP2020/063901 dated Jul. 6, 2020 (11 pages).
German-language Office Action issued in German Application No. 10 2019 113 942.2 dated Apr. 15, 2020 (12 pages).
International Preliminary Report on Patentability (PCT/IB/326 & PCT/IB/373) issued in PCT Application No. PCT/EP2020/063901 dated Dec. 2, 2021, including English translation of document C2 (German-language Written Opinion (PCT/ISA/237) filed on Nov. 23, 2021) (11 pages).
Russian-language Office Action issued in Russian Application No. 2021133739/11(071285) dated Apr. 29, 2022 (seven (7) pages).
Japanese Office Action for JP Application No. 2021-569538 dated Jun. 13, 2023 (14 pages).
Chinese-language Office Action issued in Chinese Application No. 202080038455.6 dated Apr. 11, 2023 with partial English translation (11 pages).
German-language European Office Action issued in European Application No. 20 727 244.4 dated Jun. 26, 2024 (8 pages).

* cited by examiner

STEERING KNUCKLE OF A UTILITY VEHICLE, AXLE ASSEMBLY AND VEHICLE AXLE OF A UTILITY VEHICLE

BACKGROUND AND SUMMARY OF THE INVENTION

The present invention relates to a steering knuckle of a utility vehicle.

The present invention furthermore relates to an axle assembly of a utility vehicle as well as to a vehicle axle of the utility vehicle.

The loads resulting from loading, dynamic loads resulting from the driving operation as well as loads caused by braking are usually very high in utility vehicles. The axles of utility vehicles are therefore usually embodied as forged constructions or welded constructions.

If there is sufficient space available in the vehicle superstructure, for example in the case of military vehicles with large suspension travel, the axle can be embodied as a hollow axle or else as a casting. A drive shaft of the wheels of the vehicle that are disposed on the axle here is preferably received in the center of the axle, as a result of which a lot of space is required in radial terms of the axle.

Alternatively, transmissions that at the end of the axle are accommodated in a transmission housing are used, this being associated with an extremely large diameter and also requiring a relatively large amount of installation space in the axial direction. Solutions of this type are used in particular in the case of buses.

When accommodating a drive shaft in the case of steered axles, it has to be taken into account that the vehicle wheel must be pivotable about a pivot angle of up to 50°, this resulting in that the drive shaft must also be conceived for such a movement.

In passenger motor vehicles this is solved in that the construction of the suspension is fastened to the vehicle chassis (so-called independent wheel suspension). The rotation of the drive shaft here can be transferred to the wheels by universal joints, for example.

It is an object of the present invention to provide a steering knuckle of a utility vehicle that is able to be used for suspending driven as well as non-driven vehicle wheels.

It is a further object to provide an axle assembly of a utility vehicle that is able to be used for driven as well as non-driven vehicle wheels.

It is a further object of the invention to provide a vehicle axle of a utility vehicle that is able to be used on driven as well as non-driven vehicle wheels.

These and other objects are achieved by a steering knuckle of a utility vehicle, by an axle assembly of a utility vehicle, and by a vehicle axle of a utility vehicle, having the features of the independent claims.

The steering knuckle according to the invention has a main body as well as a steering knuckle bearing for receiving in a rotating articulated manner a vehicle axle.

The steering knuckle furthermore has a hub-type receptacle which is in the shape of a pot and is open toward a rim of a vehicle wheel and in which a roller bearing and a bearing journal are able to be received.

The main body of the steering knuckle has an opening for receiving a drive shaft that opens into the hub-type receptacle.

The advantage of a steering knuckle configured in such a manner lies in that the bearing journal, through the opening of the main body, can be connected directly or indirectly to a drive shaft.

When the steering knuckle is used on an axle having non-driven vehicle wheels, this opening can be closed by a cover if required.

The axle assembly according to the invention of a utility vehicle has a steering knuckle having a main body, a steering knuckle bearing and a hub-type receptacle which is in the shape of a pot and is open toward a wheel mount, as well as a brake disc and a bearing journal that in the pot-shaped receptacle is mounted by way of a roller bearing so as to be rotatable about a wheel rotation axis.

A vehicle axle is pivotably mounted on the steering knuckle bearing. The wheel mount and the brake disc here are coupled in a rotationally fixed manner to the bearing journal.

The axle assembly can furthermore have a drive shaft.

The head of such a drive shaft here, through an opening of the main body of the steering knuckle that opens into the hub-type receptacle, directly or by way of a joint, is able to be coupled to the bearing journal.

Such an axle assembly of a utility vehicle has the advantage that said axle assembly is able to be used for driven wheel axles as well as for non-driven wheel axles.

The vehicle axle according to the invention of a utility vehicle has an axle longitudinal member and an axle head having an eye for receiving a kingpin for coupling to a steering knuckle bearing of a steering knuckle.

A stay having a further eye for receiving a further kingpin for coupling to the steering knuckle bearing extends from a support surface of the axle longitudinal member close to the axle head.

The stay here has a cutout for receiving the drive shaft.

Such a vehicle axle has the advantage that said vehicle axle is able to be used for driven wheel axles as well as for non-driven wheel axles.

A further advantage of the steering knuckle, the axle assembly and the vehicle axle lies in that a standard forged axle as is customary in utility vehicles, in particular on the front axle, can be used.

If the axle is to be driven, the same steering knuckle can be used as in non-driven axles in that a drive shaft is passed through the opening in the main body of the steering knuckle and through the cutout in the stay of the vehicle axle.

As opposed to the drive connection in purely axial assemblies in conjunction with the use of hollow shafts or the attachment via a transmission housing, the steering knuckle according to the invention, the axle assembly according to the invention and the vehicle axle according to the invention enables the drive shaft to be coupled to the bearing journal by way of a joint.

Advantageous variants of embodiment of the invention are the subject matter of the dependent claims.

According to one advantageous variant of embodiment of the steering knuckle according to the invention, the opening for receiving a drive shaft is configured in a region of the main body between two bearing eyes of the steering knuckle bearing, thus enabling the drive shaft to be received in a space-saving manner on the steering knuckle.

The opening for receiving the drive shaft, when viewed in a direction away from the pot-shaped receptacle, is configured as a radially widening joint receptacle for receiving a joint, thus enabling the joint to be guided in a simple and space-saving manner on the steering knuckle.

According to a further preferred variant of embodiment, at least one controlling attachment is molded on the main body of the steering knuckle, thus enabling the attachment of a control arm such as, for example a tie rod or a steering linkage, in a simple manner.

According to one advantageous variant of embodiment of the axle assembly according to the invention, the joint coupled to the drive shaft is configured as a constant velocity joint.

According to an alternative variant of embodiment, this joint is configured as a universal joint.

Both types of joint enable the rotating movement of the drive shaft to be transmitted in a simple manner to the bearing journal that is connected in a rotationally fixed manner to the vehicle wheel.

According to one preferred variant of embodiment, a head of the bearing journal is connected in a form-fitting manner to the head of the drive shaft or of the joint, thus achieving a rotationally fixed connection between the bearing journal and the drive shaft or the joint.

According to one further preferred variant of embodiment, a head of the bearing journal is provided with a toothing which engages in a toothing of the head of the drive shaft or of the joint, in order for the rotating movement to be transferred in a simple and reliable manner from the joint to the bearing journal.

According to one further advantageous variant of embodiment, an external shell of the constant velocity joint is at least partially received in the joint receptacle.

Exemplary embodiments of the invention will be explained in more detail hereunder by means of the appended drawings.

DETAILED DESCRIPTION OF THE DRAWINGS

In the description of the figures hereunder, terms such as top, bottom, left, right, front, rear, etc., refer exclusively to the exemplary illustration and position of the steering knuckle, the steering knuckle bearing, the roller bearing, the kingpin, the drive shaft and the like chosen in the respective figures. These terms are not to be understood as limiting, i.e. the references may change as a result of different operating positions or the mirror-symmetrical design or the like.

Figure 1:
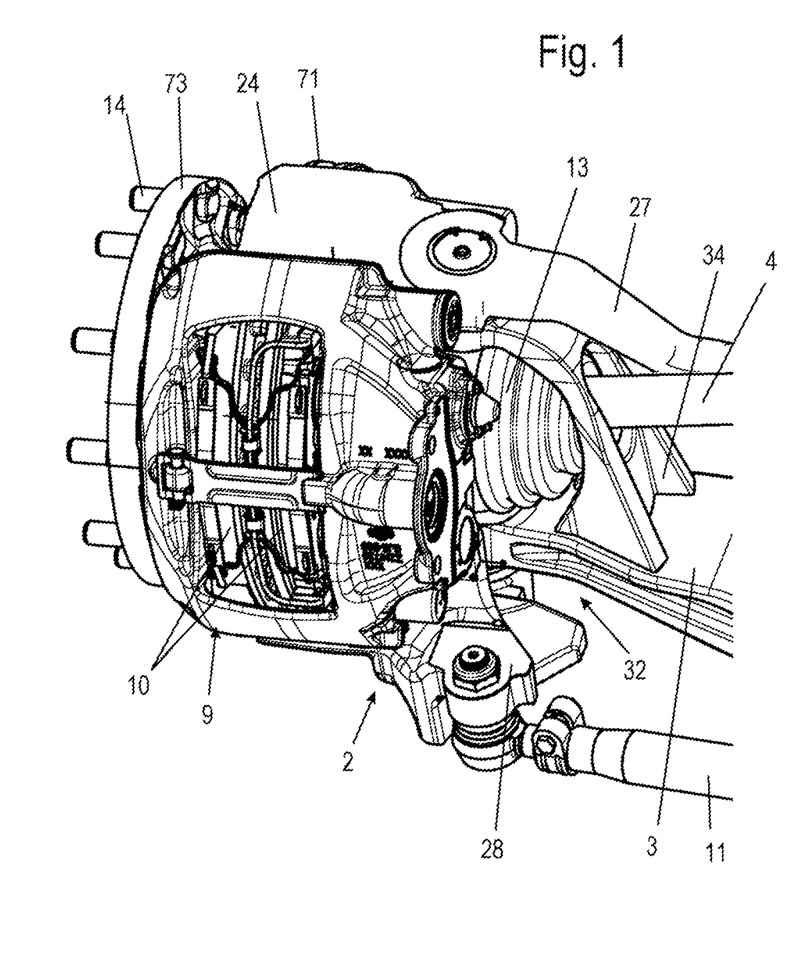
FIG. 1 is a perspective view of an axle assembly of a utility vehicle having a disc brake attached thereto.

An axle assembly of a utility vehicle is illustrated in FIG. 1, said axle assembly having a steering knuckle 2 and a disc brake which is fastened to the latter and has a brake caliper 9, brake pads 10 and a brake disc.

The construction of the brake caliper 9, of the brake disc 7 as well as of the brake pads 10 is known from the prior art so that a more detailed description of those parts is dispensed with here.

Figure 4:
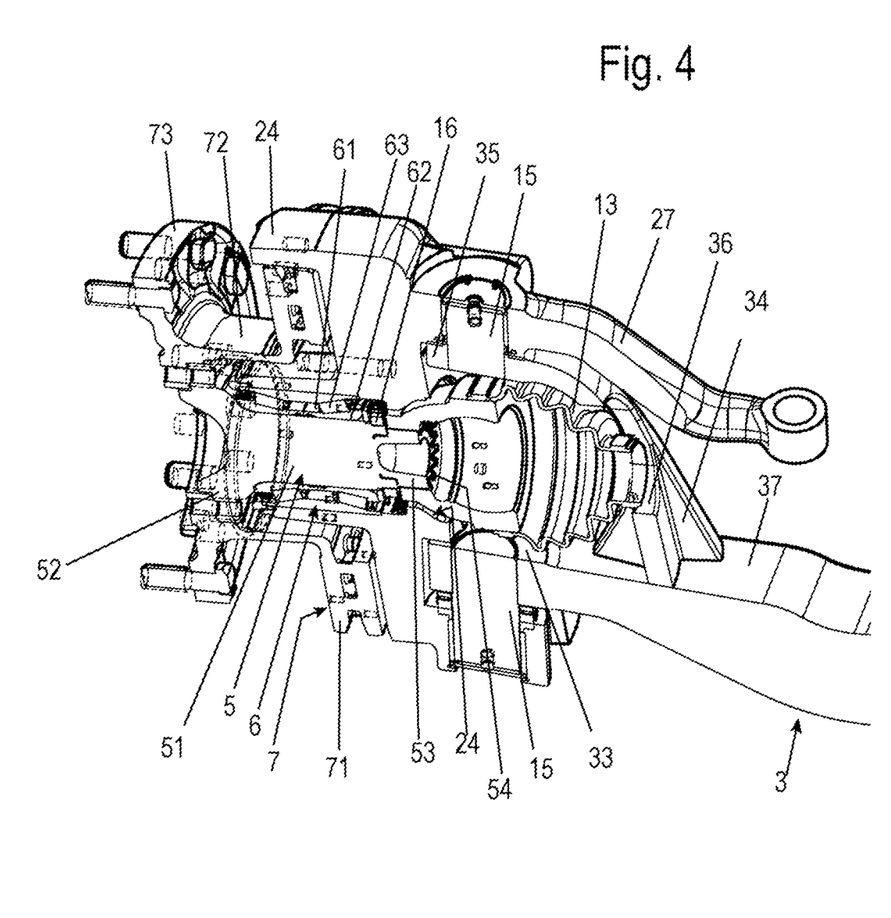
FIG. 4 is a perspective sectional illustration of the axle assembly shown in FIG. 2, but having a driven bearing journal.

The brake pad 7 in the variant embodiment illustrated in FIG. 4 has a brake ring 71 having to brake faces onto which the brake pads 10 can be pressed, a cover 72 that from the brake ring extends in a cylindrical manner toward the vehicle wheel (not shown), and a wheel mount 73 which from said cover 72 widens in a outwardly radial manner and to which the vehicle wheel can be fastened using wheel bolts 14.

It is also conceivable for the wheel mount to be configured as a separate component and by way of screws to be fixed to a flange of the brake disc 7 that adjoins the cover 72.

Further receptacle bores for receiving further screws for fixing a bearing journal 5 are provided radially further inward, in the region of the wheel mount 73.

The bearing journal 5, as is shown in an exemplary manner in FIG. 4, has a cylindrical journal core 51, a radially widened flange 52 that extends toward the vehicle wheel, or the wheel mount 73, respectively, and has receptacle bores for connecting in a rotationally fixed manner to the wheel mount 73 of the brake disc 7, as well as a head which faces away from the wheel mount 73 and has a toothing, in particular an external toothing 54 as is illustrated in FIG. 4.

Figure 5:
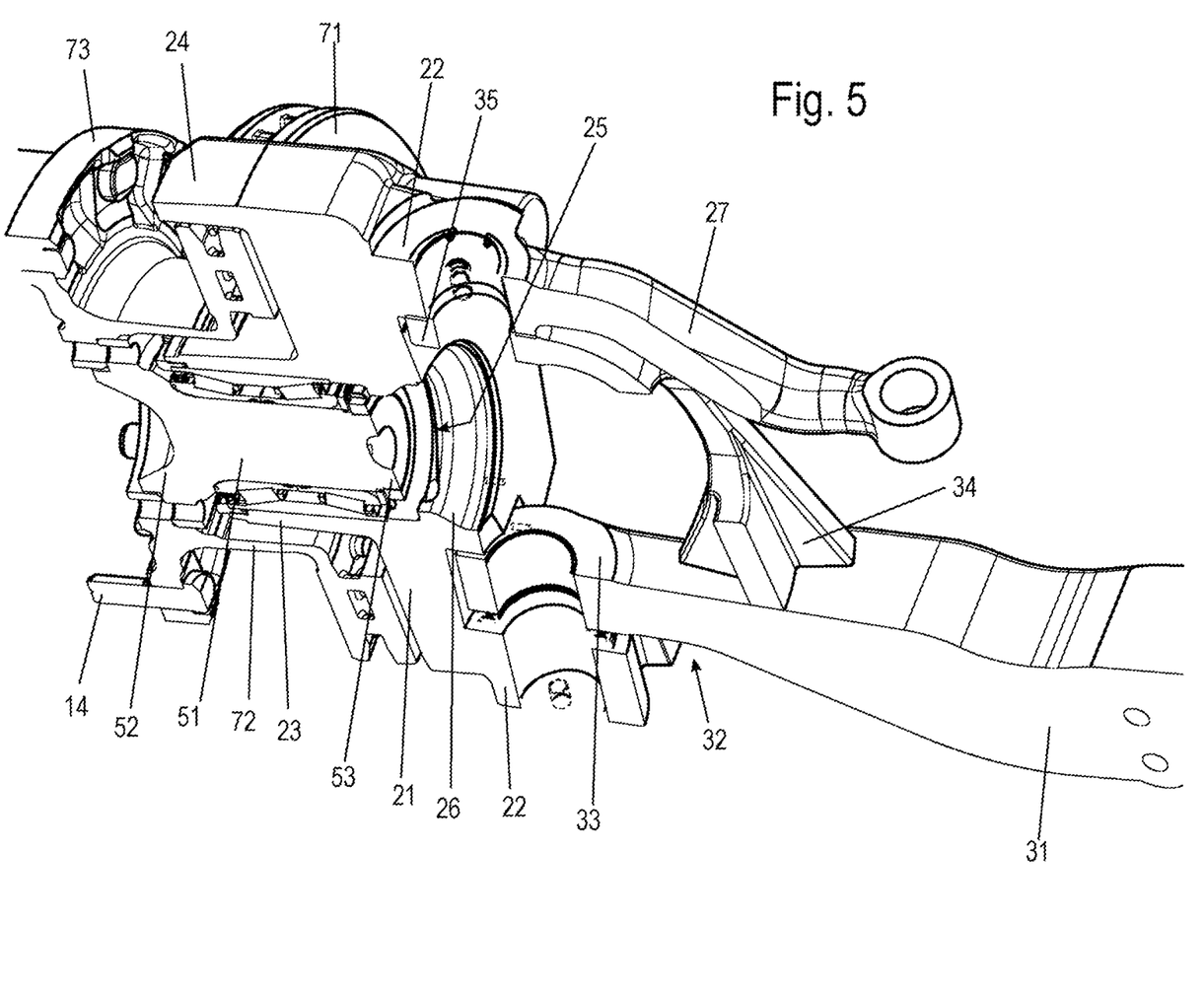
FIG. 5 is an illustration corresponding to that of FIG. 4, having a bearing journal of an alternative configuration without an end-proximal toothing for the use in a non-driven axle assembly.

For the use in a non-driven vehicle axle it is also conceivable for the bearing journal 5 to be configured without a toothing, as is illustrated in FIG. 5.

The bearing journal 5 here, by way of a roller bearing 6 having an bearing inner ring 62, the latter established in a friction-fitting manner on the external face of the journal core 51, a bearing outer ring 61 and rolling member 63 disposed therebetween, is received in a hub-type receptacle 23 which is in the shape of a pot and is open toward a rim of a vehicle wheel, or toward the wheel mount 73 of the brake disc 7, respectively, wherein the bearing outer ring 61 bears in a friction-fitting manner on the internal face of the receptacle 23.

The bearing journal 5 is axially secured by a grooved nut 16, the latter close to the head 53 of the bearing journal 5 encompassing the journal core 51.

Figure 3:
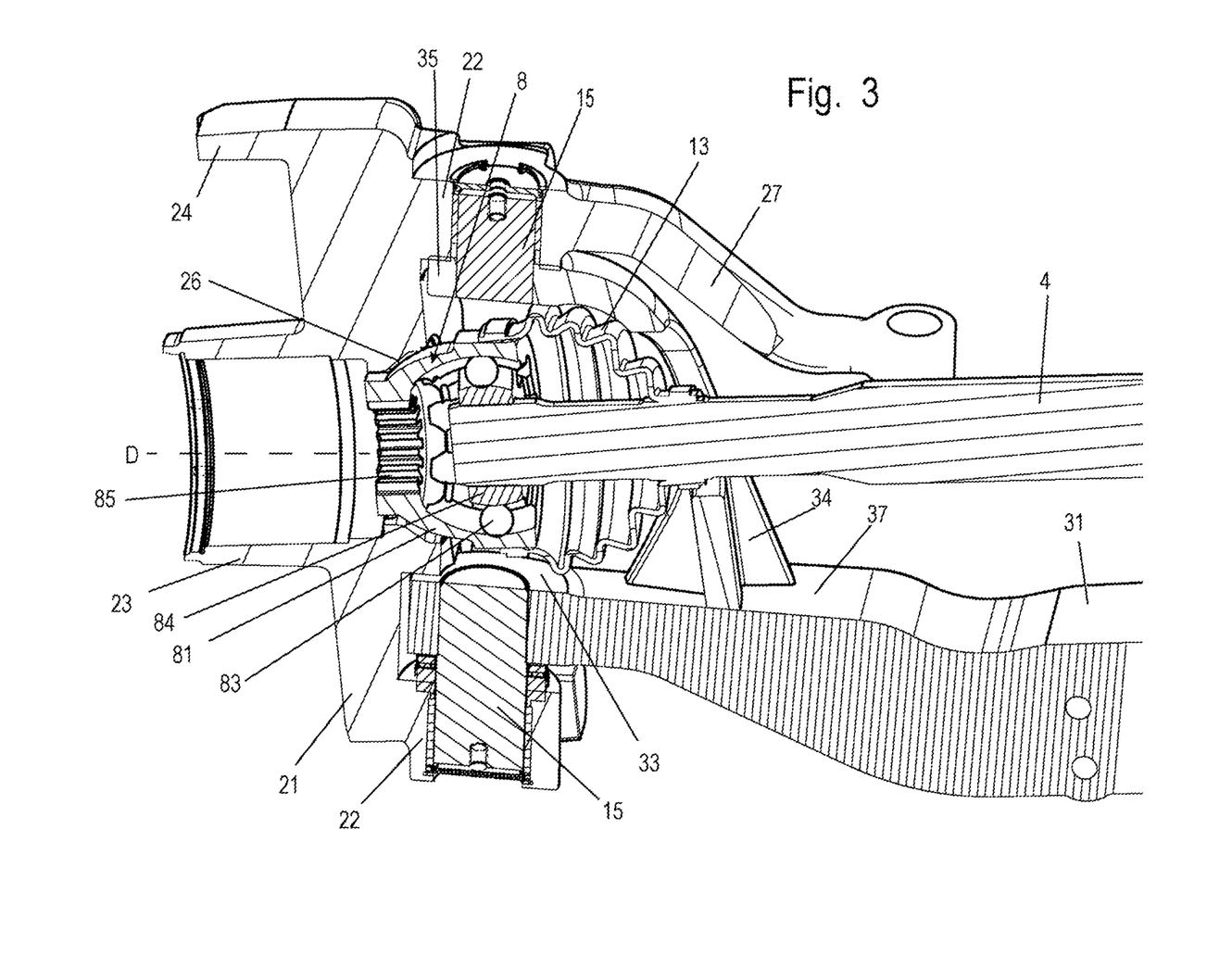
FIG. 3 is a schematic perspective sectional view through the axle assembly shown in FIG. 2, having an inserted drive axle.

As is furthermore shown in FIGS. 3 and 4, the steering knuckle 2 has a main body 21 as well as a steering knuckle bearing 22 four receiving in a rotating articulated manner a vehicle axle 3.

The vehicle axle 3 by way of kingpins 15 here is received in eyes of the steering knuckle bearing 22 provided for this purpose, wherein the kingpins 15 also penetrate corresponding eyes 33, 35 of an axle head 32 of the axle 3.

The kingpins 15 are held in the eyes of the steering knuckle bearing 22 by guide bushes.

The main body 21 of the steering knuckle 2 furthermore has an opening 25 that opens into the hub-type receptacle 23 for receiving the drive shaft 4, or a joint 8 coupled to the drive shaft 4. The latter variant of embodiment is illustrated in FIGS. 1 to 4.

The opening 25 here is configured in the region of the main body 21, between two bearing eyes of the steering knuckle bearing 22.

In the exemplary embodiment shown here, in which the drive shaft 4 is coupled to the bearing journal 5 by way of a joint 8, the opening 25, when viewed in a direction away from the pot-shaped receptacle 23, has a radially widening joint receptacle 26 for receiving the joint 8.

The joint 8 here is preferably configured as a constant velocity joint as is illustrated in an exemplary manner in FIG. 3.

This joint 8 has an external shell 81 which is partially received in the joint receptacle 26 and on the end side thereof that faces the opening 25 is configured so as to be cylindrical with an internal toothing 85 that engages in the external toothing 54 on the head 53 of the bearing journal 5 and thus represents a rotationally fixed connection between the joint 8 and the bearing journal 5.

Other form-fitting designs of the connection between the head 53 of the bearing journal 5 and the joint 8, or the head 42, respectively, of the drive shaft 4 are also conceivable.

In order to enable a steering movement of the steering wheel, this to be enabled in particular in the case of a use in a front axle of a utility vehicle, the constant velocity joint has an internal shell 82 which by way of rolling members 83 is coupled in a rotating articulated manner to the external shell 81.

A shaft receptacle 84 is established in the internal shell 82, for example in the form of clamping connection or a press-fit connection, in which the drive shaft 4 is received.

In order for the region of the joint 8 to be protected in relation to environmental influences, a bellows 13 is preferably fastened to the external shell 81 of the joint 8, the other end of said bellows 13 being fastened to the rod 41 of the drive shaft 4.

As an alternative to the constant velocity joint illustrated in FIGS. 3 and 4, it is also conceivable for a universal joint to be used as the joint 8, said universal joint likewise enabling a coupling between two shafts that is able to be moved at an angle.

Figure 8:
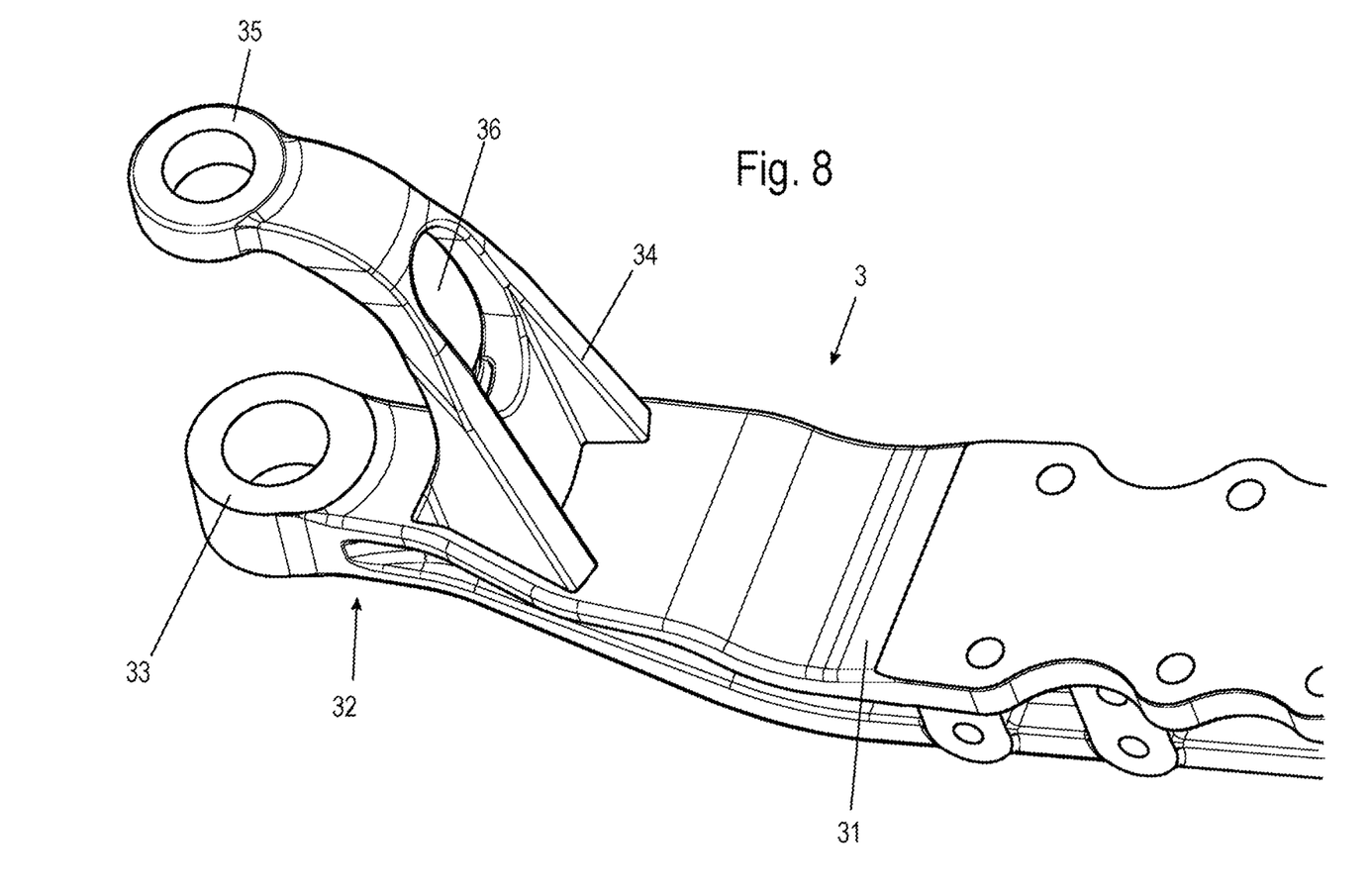
FIG. 8 is a perspective view of a portion of a vehicle axle.

A preferred variant of embodiment of a vehicle axle 3 of the generic type is illustrated in FIG. 8.

The vehicle axle 3 has an axle longitudinal member 31 as well as an axle head 32 having an eye 33 for receiving a kingpin 15 which serves for coupling to the steering knuckle bearing 22 of the steering knuckle 2.

A stay 34, which is curved here and on the end of which a further eye 35 for receiving a further kingpin 15 for coupling to the steering knuckle bearing 22 is molded, extends from a support surface 37 of the axle longitudinal member 31, close to the axle head 32.

The stay 34 here has a cutout 36 which serves for receiving the drive shaft 4. The cutout 36 here is shaped as a slot which extends parallel to the kingpin 15, thus enabling a movement of the drive shaft 4 perpendicular to the longitudinal axis of the latter within the cutout 36.

Figure 2:
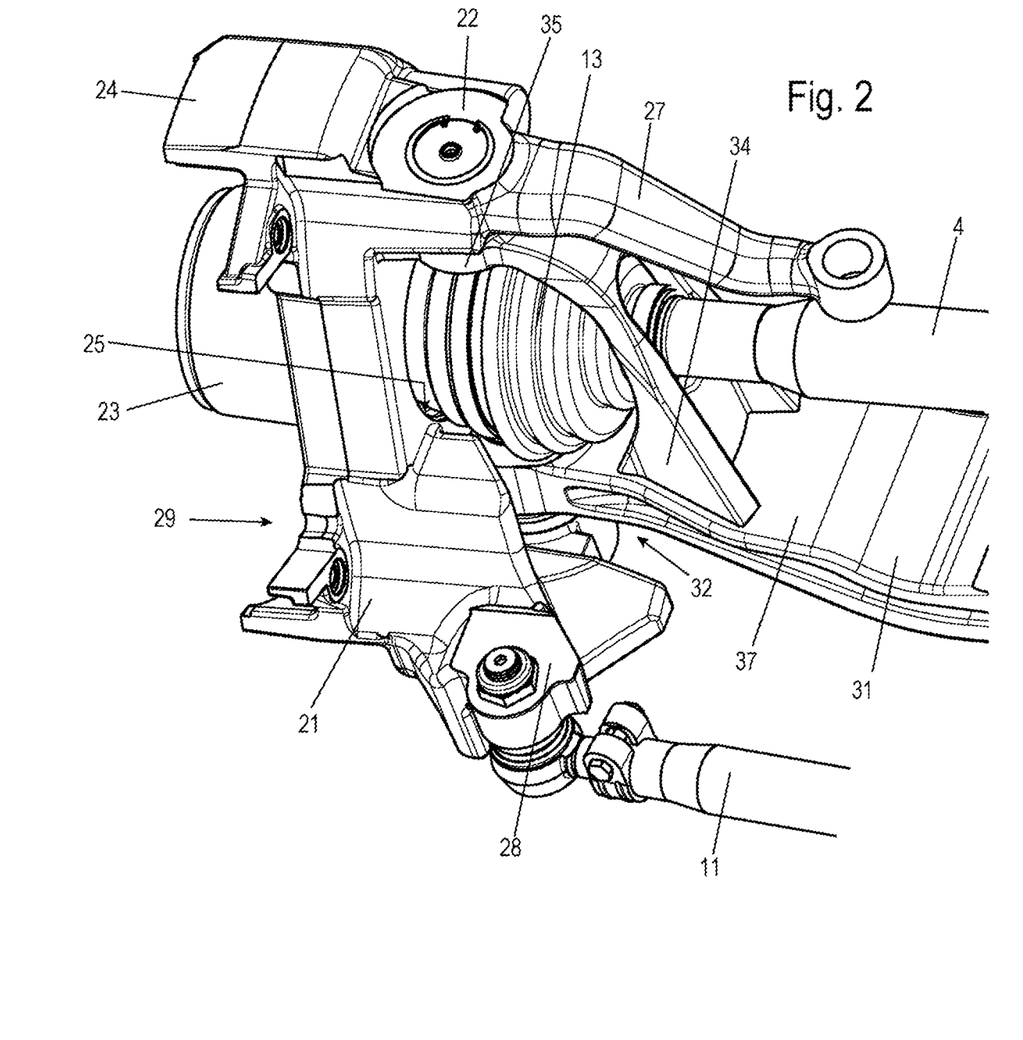
FIG. 2 is a perspective illustration of the axle assembly from FIG. 1, without an illustration of the disc brake.

As is furthermore shown in FIGS. 1 and 2, at least one control arm attachment 27, 28 is molded on the main body 21 of the steering knuckle 2.

One of the control arm attachments is here is configured as a control arm 27. The second control arm attachment 28 in the shape of a plate extends laterally to the steering knuckle bearing 22 so as to be approximately parallel to the vehicle axle 3.

Figure 6:
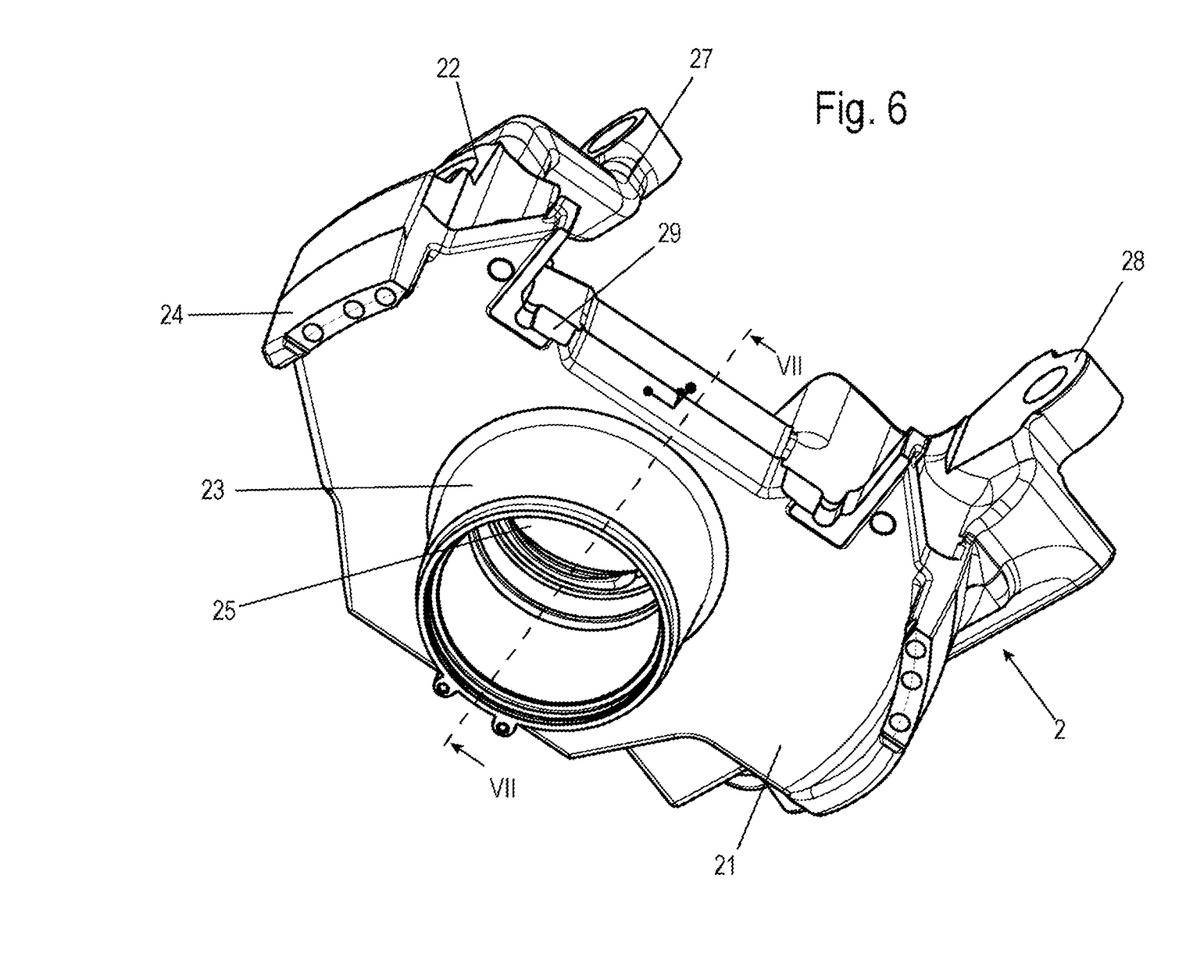
FIG. 6 is a perspective illustration of the steering knuckle when viewed from the wheel side.
Figure 7:
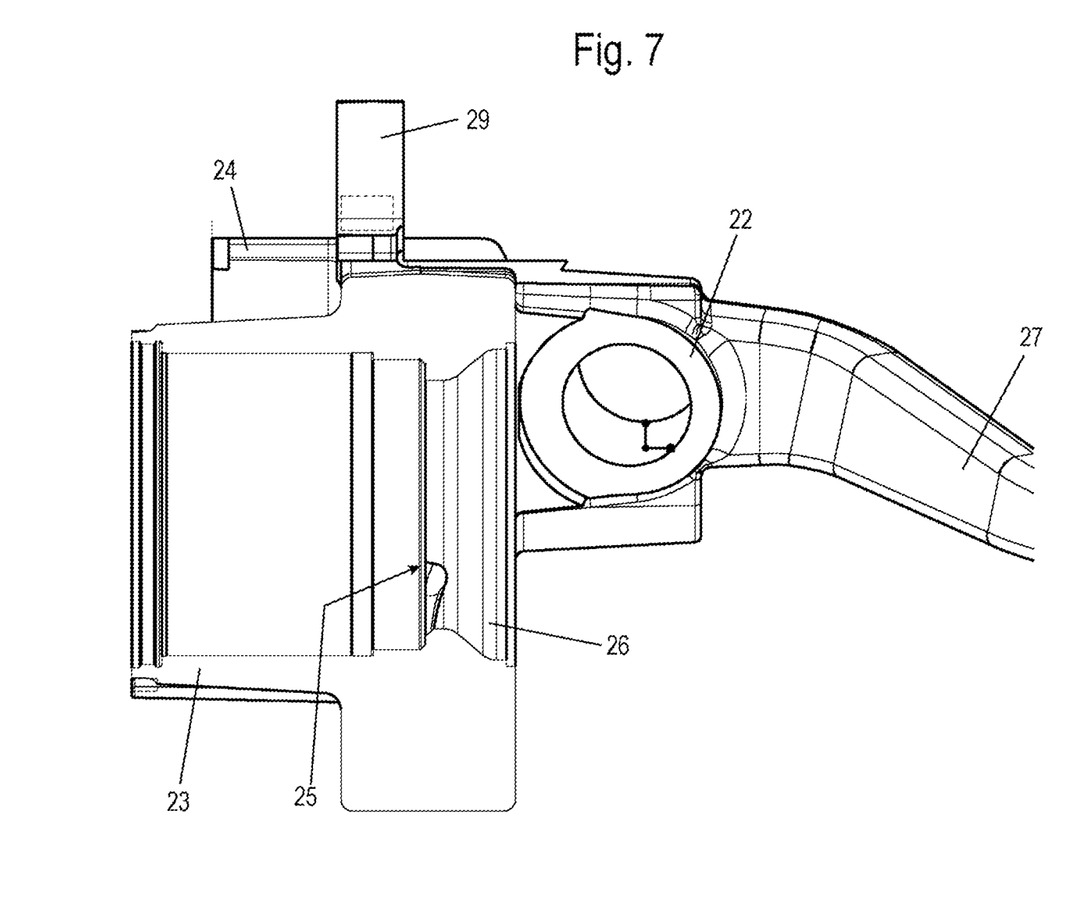
FIG. 7 is a sectional illustration through the steering knuckle illustrated in FIG. 6, along a section plane identified by VII-VII in FIG. 6.

As is furthermore shown in FIGS. 2 and 6, a pad receptacle 29 which serves for receiving one of the brake pads 10 is molded on the steering knuckle 2 in the preferred variant of embodiment shown here.

Brake disc mounts 24, having on the end side receptacles for attaching a brake mount part that serves for receiving a brake pad 10 on the wheel, extend radially outside the hub-type receptacle 23, from the main body 21 in the direction of the wheel mount 73.

By virtue of the drive shaft 4 being separately guided, electric motors which as additional propulsion can be fitted in the region of a vehicle superstructure 12, are also conceivable as drive motors for driving the drive shaft 4.

In summary, by way of such an axle assembly, such a steering knuckle 2 and such an axle 3 it is made possible for these parts to be used in a driven vehicle axle as well as in a non-driven vehicle axle.

LIST OF REFERENCE SIGNS

2 Steering knuckle
21 Main body
22 Steering knuckle bearing
23 Receptacle
24 Brake disc mount
25 Opening
26 Step
27 Control arm
28 Control arm attachment
29 Pad receptacle
3 Axle
31 Axle longitudinal member
32 Axle head
33 Eye
34 Stay
35 Eye
36 Cutout
37 Support surface
4 Drive shaft
41 Rod
42 Head
43 Toothing
5 Bearing journal
51 Journal core
52 Flange
53 Head
54 External toothing
6 Roller bearing
61 Bearing outer ring
62 Bearing inner ring
63 Rolling member
7 Brake disc
71 Brake ring
72 Cover
73 Wheel mount
8 Joint
81 External shell
82 Internal shell
83 Rolling member
84 Shaft receptacle
85 Toothing
9 Brake caliper
10 Brake pad
11 Tie rod
12 Vehicle superstructure
13 Bellows
14 Wheel bolt
15 Kingpin
16 Grooved nut
D Wheel rotation axis

What is claimed is:
1. An axle assembly of a utility vehicle comprising:
a steering knuckle comprising:
a main body;
a steering knuckle bearing for receiving in a rotating articulated manner a vehicle axle, wherein the steering knuckle bearing comprises first and second steering knuckle bearing eyes; and a hub receptacle which is in the shape of a pot and is open toward a rim of a vehicle wheel and in which a roller bearing and a bearing journal are able to be received, wherein the main body has an opening that opens into the hub receptacle for receiving a drive shaft or a joint coupled to the drive shaft, wherein at least a portion of the opening of the main body has a concave surface; and an axle comprising:

an axle longitudinal member having an upper surface disposed below the opening of the main body;

an axle head formed at the end of the axle longitudinal member and having a lower axle bearing eye;

a first kingpin coupling the lower axle bearing eye to the first steering knuckle bearing eye;

a stay having an upper axle bearing eye spaced above the lower axle bearing eye, wherein the stay extends upwardly and outwardly from, and overlies, the upper surface of the axle longitudinal member, and wherein the stay has a cutout for receiving the drive shaft; and a second kingpin coupling the upper axle bearing eye to the second steering knuckle bearing eye.

2. The axle assembly as claimed in claim 1, wherein the opening for receiving the drive shaft is configured in a region of the main body, between the first and second steering knuckle bearing eyes of the steering knuckle.

3. The axle assembly as claimed in claim 2, wherein the opening for receiving the drive shaft, when viewed in a direction away from the hub receptacle, is configured as a radially widening joint receptacle for receiving a joint.

4. The axle assembly as claimed in claim 1, further comprising:

at least one control arm attachment molded on the main body.

5. The axle assembly of claim 1 wherein the hub receptacle and main body are integrally formed as a one-piece unit.

6. An axle assembly of a utility vehicle, comprising:

a steering knuckle having a main body, a steering knuckle bearing and a hub receptacle which is in the shape of a pot and is open toward a wheel mount;

a brake disc;

a bearing journal that is mounted in the hub receptacle by way of a roller bearing so as to be rotatable about a wheel rotation axis; and a vehicle axle comprising an axle longitudinal member having an upper surface and a stay extending from the axle longitudinal member, wherein the stay extends upwardly and outwardly from, and overlies, the upper surface of the axle longitudinal member, wherein the longitudinal member and the stay are pivotably mounted on the steering knuckle bearing, and wherein the stay has a cutout for receiving a drive shaft; and wherein the wheel mount and the brake disc are coupled in a rotationally fixed manner to the bearing journal, and a head of the drive shaft, through an opening of the main body of the steering knuckle that opens into the hub receptacle, directly or by way of a joint, is able to be coupled to the bearing journal, wherein at least a portion of the opening of the main body has a concave surface, wherein the upper surface of the axle longitudinal member is disposed below the opening of the main body and underlies the drive shaft.

7. The axle assembly as claimed in claim 6, wherein the joint coupled to the drive shaft is configured as a constant velocity joint.

8. The axle assembly as claimed in claim 6, wherein the joint coupled to the drive shaft is configured as a universal joint.

9. The axle assembly as claimed in claim 6, wherein a head of the bearing journal is connected in a form-fitting manner to the head of the drive shaft or of the joint.

10. The axle assembly as claimed in claim 6, wherein a head of the bearing journal is provided with a toothing which engages with a toothing of the head of the drive shaft or of the joint.

11. The axle assembly as claimed in claim 6, wherein an external shell of the joint is at least partially received in a joint receptacle defined by the opening.

12. The axle assembly of claim 6 wherein the hub receptacle and main body are integrally formed as a one-piece unit, and wherein the roller bearing comprises a bearing outer ring friction fitted in an internal face of the hub receptacle.

* * * * *